United States Patent [19]
Daub

[11] Patent Number: 5,860,131
[45] Date of Patent: Jan. 12, 1999

[54] METHOD FOR PROVIDING DYNAMIC CACHE MANAGEMENT IN A COMPUTER SYSTEM

[75] Inventor: Jonathan A. Daub, New York, N.Y.

[73] Assignee: Helix Software Co., Long Island City, N.Y.

[21] Appl. No.: 664,784

[22] Filed: Jun. 17, 1996

[51] Int. Cl.$^6$ .................................................. G06F 12/08
[52] U.S. Cl. ................... 711/170; 711/6; 711/118
[58] Field of Search ........................... 395/406; 711/113, 711/117, 118, 129, 153, 170, 171, 172, 173, 214, 202, 203, 205, 206, 207, 208, 209, 6

[56] References Cited

U.S. PATENT DOCUMENTS

| | | | |
|---|---|---|---|
| 4,881,164 | 11/1989 | Hailpern et al. | 711/147 |
| 5,386,536 | 1/1995 | Courts et al. | 711/136 |
| 5,537,635 | 7/1996 | Douglas | 711/129 |
| 5,581,736 | 12/1996 | Smith | 711/170 |

*Primary Examiner*—Eddie P. Chan
*Assistant Examiner*—Hiep T. Nguyen
*Attorney, Agent, or Firm*—Darby & Darby

[57] ABSTRACT

A method for dynamic caching of data in a disk based operating system whereby physical memory is dynamically shared between the cache management system and the operating system. The operating system is monitored to determine the availability of free physical memory in the computer system and its location therein. A portion of free physical memory may be borrowed from the memory management component of the operating system and allocated to the cache management system for the purpose of increasing the cache memory size. The borrowed physical memory is returned to the memory management software component when needed by the operating system.

10 Claims, 4 Drawing Sheets

METHOD FOR PROVIDING DYNAMIC CACHE MANAGEMENT IN A COMPUTER SYSTEM

FIELD OF THE INVENTION

This invention relates to memory management in a computer system. More particularly, the invention relates to implementing dynamic caching in a micro-computer system.

BACKGROUND OF THE INVENTION

Typically, a cache is a special purpose high speed buffer interposed between a processor and a larger but slower speed data memory or data storage device. If data is stored in the cache, then it can be accessed (termed a "hit") in a shorter amount of time by the central processing unit (CPU) than if it were stored in the larger but slower data storage device. If data is not in the cache memory when referenced (termed a "miss"), then access must be made to the slower speed memory or storage device. When this occurs, the cache management software selects that portion of the cache memory containing stale data that has not been requested in a relatively long period of time and replaces it with the data just accessed from the slower data storage device.

Sophisticated cache memory schemes typically select and store data in the cache in anticipation of future use by the CPU to minimize the number of slow accesses to the slower data storage devices. As a result of the combination of the cache memory's speed, size and caching scheme, over 85% of the data requests may be performed with zero wait times. A typical cache memory has its own memory controller. When the CPU sends out a request for data, the cache memory controller intercepts it and checks the cache memory to see if the information is there so that it can be immediately accessed (a "hit"). If the information is not there (a "miss"), the cache memory controller reads the data from the slower system memory. The information is then copied into cache memory as it is sent to the processor so that all subsequent requests for that information can be read from cache memory, with zero wait times.

The advantage of caching arises from the tendency of applications to make repeated references to the same data. This clustering of data is commonly termed "locality of referencing". Performance measures include the ratio of the number of hits or misses to the total number of input/output (I/O) references. These are denominated the "hit ratio" or "miss ratio", respectively. In the past (the 1970's), hit and miss ratios were only determined from reference tables, which limited their utility to static tuning of storage devices.

In microcomputers, caches are used in two places. First, CPU chips contain separate data and instruction caches within them that lies between the CPU itself and the dynamic memory external to the chip. This creates an apparent speed up of the physical memory. Second, caching schemes are used between the microcomputer and its external mass storage devices, especially disk drives. This creates an apparent speed up of the external mass storage device. These cache schemes are referred to as "disk caches".

For example, there are many types of disk caching schemes implemented for the real mode Disk Operating System (DOS) environment. In addition, such a cache is implemented in the protected mode environment of Windows® 3.11, using memory under the control of Windows®, and consists of several components, including separate cache logic and I/O logic. The memory manager component of the Microsoft Window® operating system, version 3.1x, is incorporated into the Virtual Machine Manager (VMM) virtual device. The VMM virtual device is responsible for managing the physical memory resources (i.e., RAM) of the computer system, which comprises all available physical memory at the time the Windows® program is started. Some of this physical memory can be devoted to implementing a cache system.

The cache logic component of the Windows® 3.11 operating system is VCache. VCache provides general storage and retrieval caching services to virtual device software components. A fixed proportion of the microcomputer physical memory is allocated by VCache from the VMM for caching during the duration of a Windows® session. A primary VCache client is the File Allocation Table (FAT) file system virtual device introduced with Windows® 3.11. VCache services are also available to other system or third party virtual device components.

Since the effectiveness of a caching scheme is directly related to the amount of memory it has been assigned, it is beneficial to devote as much physical memory for caching as possible. However, it is not effective to increase the cache memory size at the expense of committed virtual memory devoted to the operating system and user applications, because doing so can cause a substantial increase in virtual memory paging to the swap file that resides on disk. When virtual memory paging occurs, there is more disk access activity and therefore the system slows down.

The performance penalty incurred by a dramatic increase in paging outweighs the slight gains realized by the extra cache memory. Therefore, a fixed size cache, such as implemented by VCache, requires the user to weigh the penalties against the benefits to determine a fixed size of the disk cache before starting the operating system. This cache size will remain fixed during the entire session. Therefore, it is an object of the invention to allow the cache size to be dynamically determined while the operating system is running so that the cache management software component can automatically maintain as large a cache as possible without incurring the increased paging penalty.

SUMMARY OF THE INVENTION

The invention is an improved cache memory management software component for micro-computer systems. In the preferred embodiment, the invention implements dynamic caching in a disk based operating system by borrowing unused, uncommitted physical memory from the operating system memory manager to utilize it for cache memory, thereby increasing the cache memory size. This borrowed free physical memory is relinquished back to the memory manager as needed by the cache memory management software component.

In a preferred embodiment of the invention, the cache management software component is compatible with and configured to replace the VCache virtual device component originally provided in the disk based operating system, Windows® 3.1x. The invention provides a method for allocating uncommitted physical memory from the memory manager software component of a computer operating system and then interacting with the memory manager to determine when to re-allocate any memory that has been allocated by the cache memory management software component to maintain optimal cache size for optimal computer system performance.

BRIEF DESCRIPTION OF THE DRAWINGS

These and other objects of the invention will become apparent from the detailed description below and the accompanying drawings in which.

DETAILED DESCRIPTION OF THE INVENTION

The invention is adapted to monitor the memory requirements of the memory management software component of a disk based operating system and to borrow uncommitted free physical memory from the memory manager and allocate it as cache memory for increasing the cache memory size, thereby decreasing the data retrieval time in a computer system. To achieve optimal effectiveness of the computer system resources, the invention releases the borrowed free physical memory back to the memory manager, when the memory manager contains a low amount of, or is deplete of free physical memory. It is noted that the dynamic caching process of the invention is intended to be implemented in a disk based operating system, such as the Microsoft® Windows® operating system, version 3.1x. It is to be appreciated, however, that the invention is described in this context for exemplary purposes only, as the invention is not to be understood to be limited thereto but rather may be incorporated in any disk based operating system.

Figure 1:
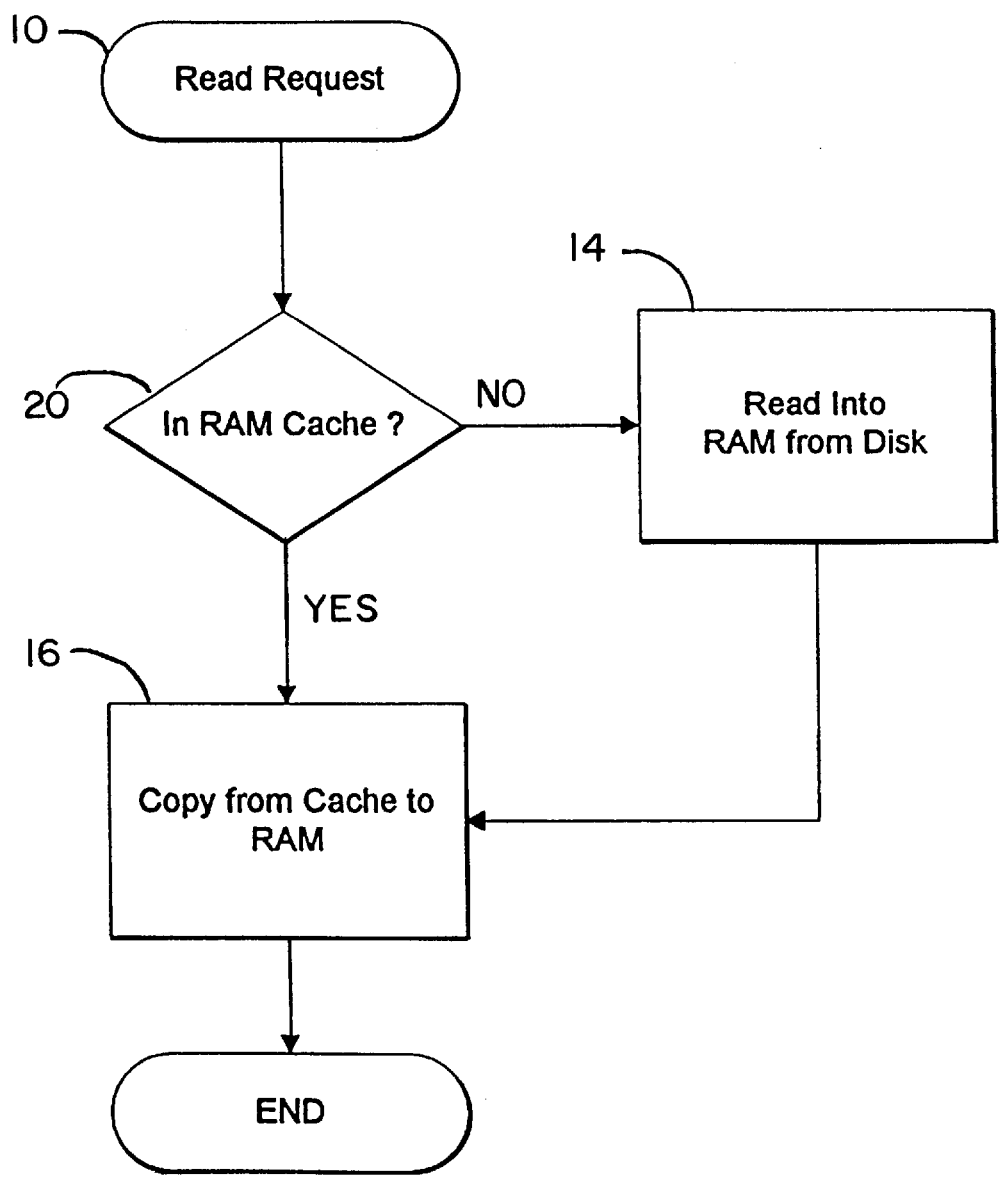
FIG. 1 is a flow diagram depicting the process used for caching in conventional computer systems.

A conventional caching operation is shown with reference to FIG. 1. The cache process 10 is invoked whenever a read request is received by the memory control system or file system driver from an operating system kernel. Decision 12 determines whether the requested data is stored in the RAM cache (a "hit"). If not (a "miss"), item 14 copies the requested data from a disk drive into RAM. If data is present in the cache, item 16 reads this data directly from the cache into RAM. Since disk based read operations require mechanical steps such as moving a disk head, the operation represented by item 14 is quite time consuming compared to reading data directly from a cache buffer. Accordingly, it is highly desirable to increase the cache memory size to increase the number of cached operations thereby decreasing the need to read data from a disk drive or other storage devices.

Figure 2A:
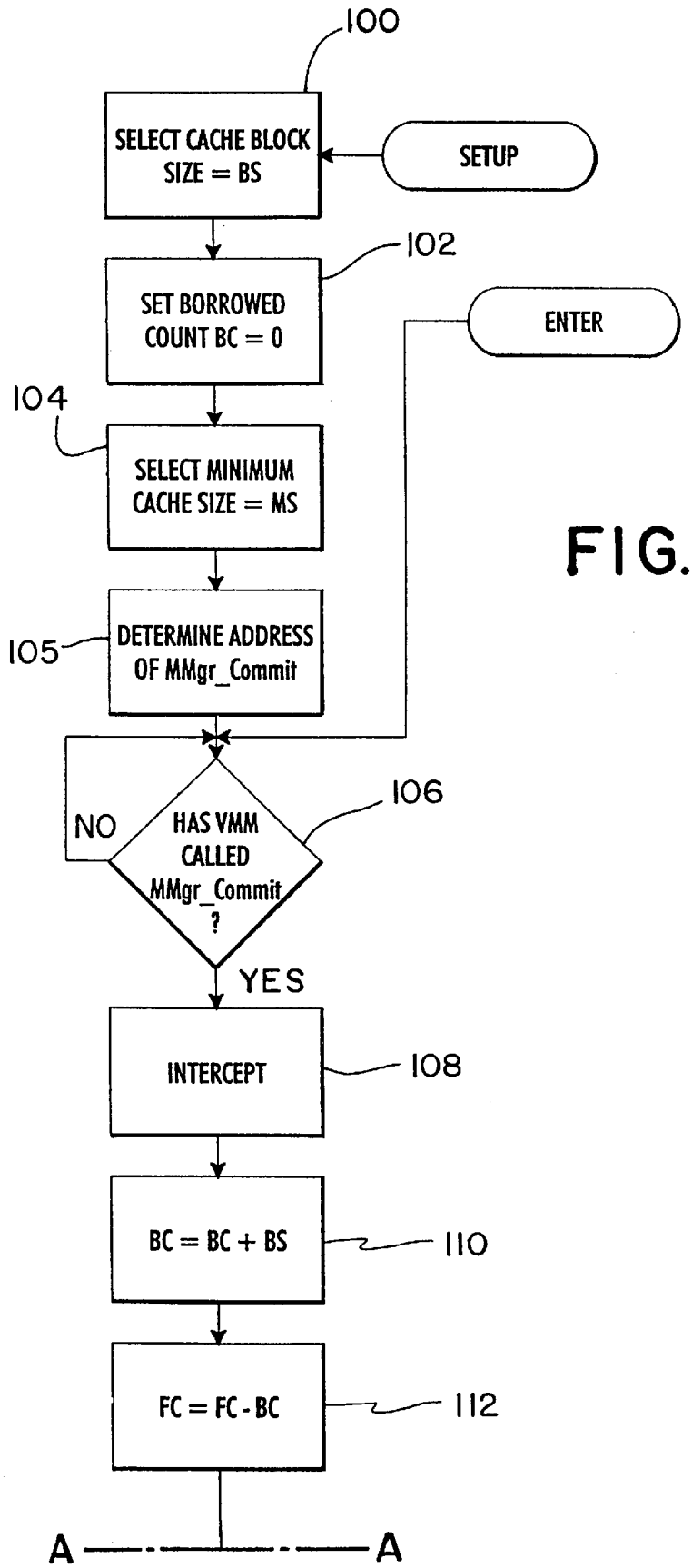
FIGS. 2A and 2B is a flow diagram of the process used for dynamic caching in a computer system in accordance with the invention.
Figure 2B:
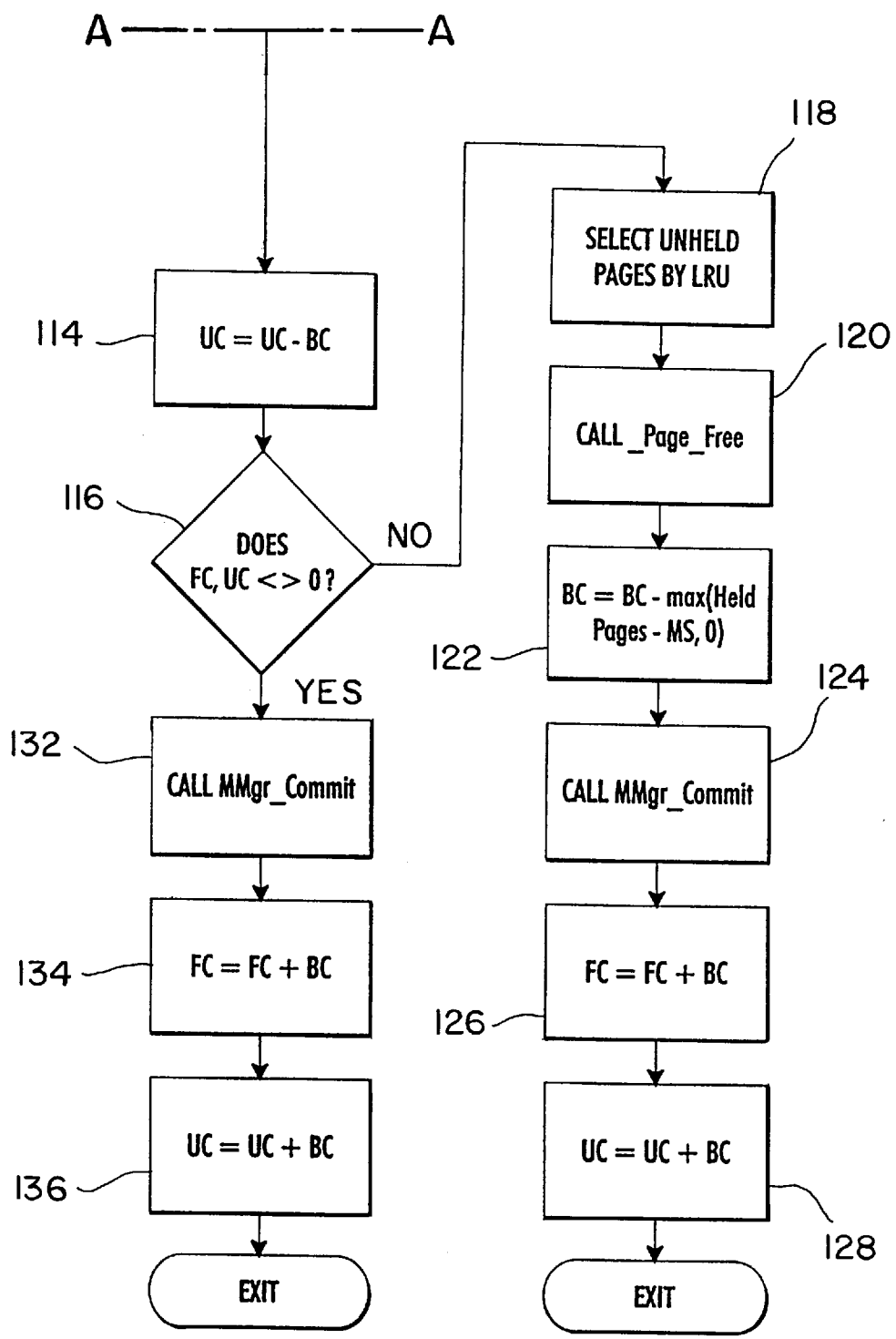

Referring now to FIGS. 2A and 2B, the process of the invention for increasing the cache memory size through dynamic caching will now be described. A first step towards achieving dynamic caching is to implement a dynamic memory cache device compatible with the VCache component provided with Windows 3.1x. This is accomplished by analyzing the virtual device services provided by VCache and incorporating similar virtual device services into the memory cache device thereby enabling existing VCache client devices to be able to operate in conjunction with dynamic caching. In order to supplant the existing VCache services of the VCache device, the memory cache device of the invention is preferably a virtual device having the identical virtual device ID as utilized by the existing VCache device. The virtual device of the invention is substituted in the SYSTEM.INI initialization file for the existing VCache device. Alternatively, the system and method of the invention may obtain the memory allocated by the existing VCache and intercept the device services of the existing VCache for the purpose of emulation. In addition, the invention may implement separate caching services in conjunction with non-VCache compliant clients, including virtual disk caches.

As previously mentioned, it is often desirable to have the cache memory size be as large as possible, unless limited by the user to a maximum memory size. It is usually also beneficial to impose a minimum cache size in order to inhibit the cache from becoming so small as to be ineffectual. Experimentation demonstrates that it is typically better to maintain a cache size of at least 256 Kb even if maintaining this minimum size results in increased swap file paging. Therefore, the invention provides for an adjustable minimum cache memory size through an initialization file setting. Physical memory in the quantity set by the minimum size is permanently allocated for caching by the invention at the commencement of the Windows® session, and is deallocated when Windows® terminates.

In accordance with the preferred embodiment, the cache memory size is capable of fluctuating between the minimum size and the maximum size based on the uncommitted physical memory dedicated to the memory manager. Preferably, the cache memory is in 4 Kb granular units termed "pages" due to the hardware design of Intel x86 processors. When a cache request occurs and all existing cache blocks (pages) are in use, the invention increases the cache memory size by borrowing from the memory manager unused, uncommitted physical memory.

Physical memory is obtained through the VMM service _PageAllocate service, and is allocated as either "locked" or "fixed". Preferably, the actual amount of uncommitted or free physical memory in the memory manager's control may be obtained through the _GetDemandPageInfo and _PageGetAllocInfo services. As described further below, the uncommitted or free physical memory size is modified by the invention process to be determinative of the actual free memory size, in addition to any cache memory that may be able to be allocated back to the memory manager. It is to be appreciated that the number of physical memory pages that have been borrowed, and are available to be released back to the memory manager, is to be termed hereafter "Borrowed Count".

Physical memory is borrowed from the memory manager in dependence upon the free physical memory under the control of the memory manager, or the maximum cache size as specified by the user. However, because the memory is considered to be "borrowed" and therefore relinquishable at any time, it is preferably desirable to reflect this circumstance in the statistics kept by the memory manager. In particular an application program or the memory manager may modify its behavior based on the free physical memory as reported by the memory manager. In order to provide that behavior is unchanged in both instances, the invention modifies the internal variables maintained by the memory manager to reflect the actual free physical memory size, in addition to the Borrowed memory count.

In the Windows® 3.1x implementation of the VMM, there are two variables: the "Free Count" variable tracks the number of free, uncommitted physical pages available, and the "Unlocked Count" is the count of total unlocked virtual memory and as such both variables are diminished to the extent of any locked or fixed memory that has been allocated by the invention for caching. These variables correspond to the DIPhys_Count and DIUnlock_Count fields returned by the _GetDemandPageInfo function. Therefore by adjusting the internal variables of the VMM, the invention is enabled to affect the return fields for the above function.

Furthermore, the DILin_Total_Free field returned by _GetDemandPageInfo is computed by the memory manager without reference to the Free Count or the Unlocked Count. To provide that this number also reflects the memory borrowed by the invention process, the _GetDemandPageInfo service itself is intercepted and this field modified to reflect the simulated value.

As previously stated, the Borrowed Count reflects the number of pages that are able to be relinquished back to the memory manager. In use it may be necessary to adjust the Borrowed Count based on the current cache usage of these pages. More specifically, a cache page may be "held" or released ("unheld") by the VCache client, through the use of the Vcache_Find, BlockVCache_Hold, Vcache_Unhold or VCache_FreeBlock procedures.

One way to accomplish this is to initialize a counter variable equivalent to the minimum size of the cache, in pages. At the time that a cache page is to be held, and is not already held, the counter value is decremented, and if it is below zero, the Borrowed Count is decremented and the DIPhys Free and DIUnlock_Count variables of the VMM are decremented. When a cache page is unheld, the counter value is incremented, and if it is below zero, the Borrowed Count is incremented and the DIPhys Free and DIUnlock_ Count variables of the VMM are incremented. Note that when a cache page is freed it is implicitly unheld.

Figure 3:
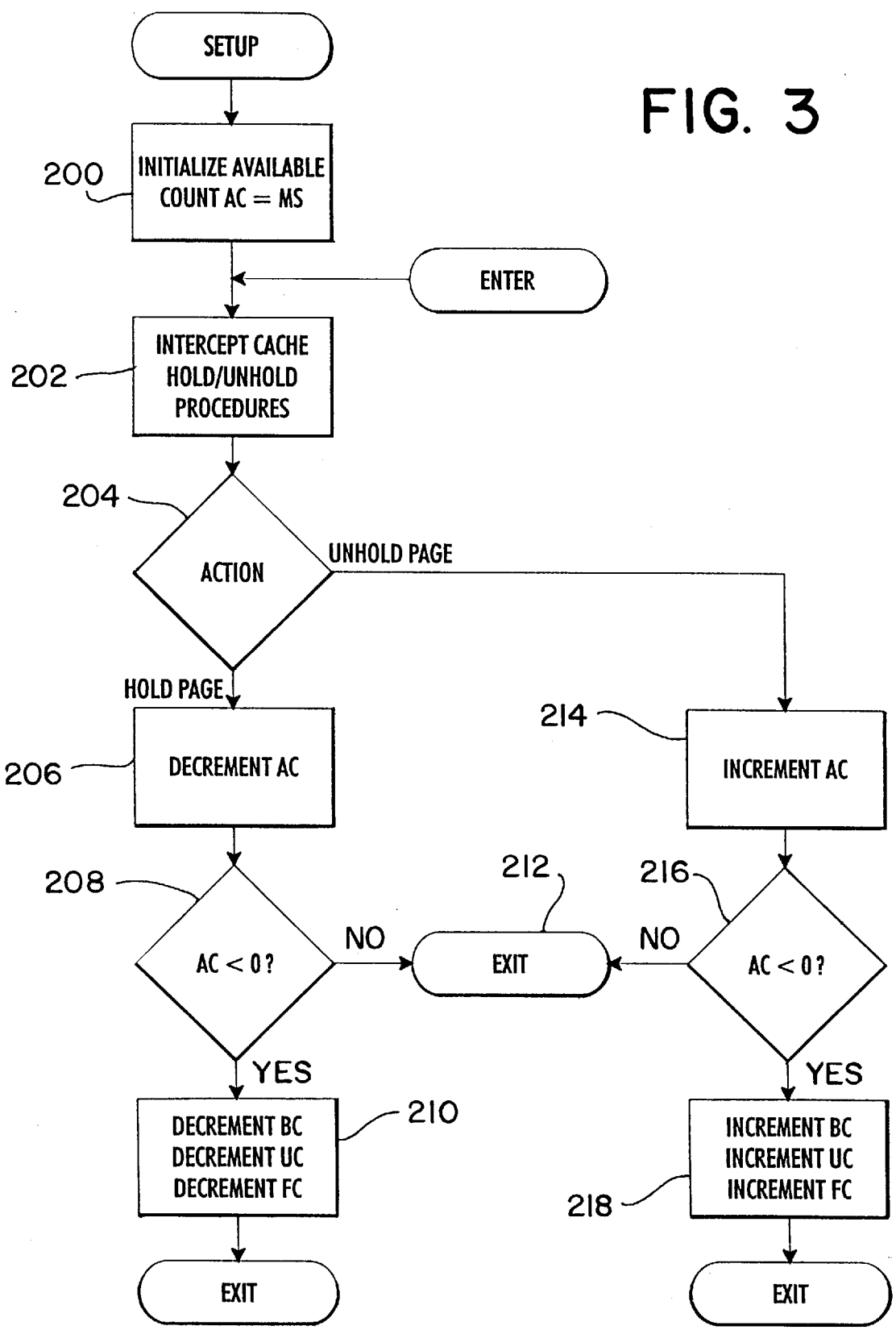
FIG. 3 is a flow diagram of the process used to accommodate held cache blocks in the process of FIG. 2.

Specifically, the steps performed in this process are best described with reference to FIG. 3. A count of available memory blocks AC is initially set to be equal to the minimum cache size MS (Step 200). The VCache block-holding and block-unholding procedures described above, namely Vcache_Find, BlockVCache_Hold, Vcache_Unhold, and VCache_FreeBlock, are then intercepted by the invention (Step 202). When one of those procedures is intercepted by the invention, a determination is made of what action is being performed (Step 204). If the procedure calls for a page to be held, then the Available Count AC is decremented (Step 206). If the count is less than zero (Step 208), then the Borrowed Count BC, the Unheld Count UC, and the Free Count FC are all decremented (Step 210). If the count is greater than or equal to zero, then those values are not adjusted and the procedure is exited (Step 212). Accordingly, as described below, the number of held pages is allowed to increase up to the minimum size of the cache without adjusting the Borrowed Count, the Unheld Count, or the Free Count. Of the number of held pages exceeds the minimum cache size, then BC, UC, and FC are all adjusted.

If the procedure calls for a page to be unheld, then the Available Count AC is incremented (Step 214). If the count is less than zero (Step 216), then the Borrowed Count BC, the Unheld Count UC, and the Free Count FC are all incremented (Step 218). If the count is greater than or equal to zero, then those values are not adjusted and the procedure is exited (Step 212). Accordingly, BC, UC, and FC are all adjusted as long as the number of held pages exceeds the minimum cache size. Once that is no longer the case, those variables remain constant.

A page that has been "held" is considered in use by the client device and will not be recycled by the cache's Least Recently Used (LRU) logic. An "unheld" page is one whose contents may be discarded at the discretion of the cache and recycled for the purpose of holding other data. For disk caching clients, such as the Virtual File Allocation Table (VFAT) device, pages are typically held while they are being accessed or while the page is being maintained in a write-behind queue. Moreover, held pages may not be relinquished and therefore the Borrowed Count may have to be adjusted based on the number of held pages. The number of held pages is allowed to increase up to the minimum size of the cache without adjusting the Borrowed Count, as follows:

Borrowed count (adj)=Borrowed count−max (Held Pages−Minimum Size, 0)

If the Borrowed Count is adjusted as indicted above, which is the result of a cache page being held or unheld, the dynamic caching process of the invention reflects the modification in the Free Count and Unlocked Count variables of the memory manager (Step 122).

In order to determine when to relinquish pages back to the memory manager, the dynamic caching process of the invention monitors the memory manager. In Windows® 3.1x, VMM free physical memory pages are committed for use as a result of a number of events that may occur, a few of which are: (a) _PageAllocate of fixed or locked memory; (b) _PageLock of allocated uncommitted memory; (c) processor page faults on not present uncommitted memory. In each of these events, the memory manager acts by calling an internal procedure termed herein MMgr_Commit_Page, which causes a free physical page to be committed and optionally locked at a specific linear address. If there is insufficient free physical memory to satisfy the memory request, the procedure causes a page to become available through virtual memory paging. To determine whether sufficient free physical memory exists, the Mmgr_Commit_Page procedure accesses the Free Count and Unlocked Count variables. It is noted that the dynamic caching process of the invention may artificially increase the Free Count and Unlocked Count variables to simulate borrowed cache memory.

The VMM memory commit routine described above can be found, for example, at offset 357C from the base of the Windows® for Workgroups 3.11 VMM. A similar routine can be easily identified in other versions of Windows®.

To monitor the memory manager's use of free physical memory, the dynamic caching process of the invention determines the address of the above described Mmgr_Commit_Page procedure (Step 105). This procedure is located within the VMM program code and is referenced at a number of other locations within the program. In order to intercept the MMgr_Commit_Page procedure (Step 106), the invention patches the start of the MMgr_Commit_Page procedure or alternatively may patch the several locations that invoke the MMgr Commit_Page procedure, among other methods, thereby redirecting execution to the interceptor portion of the invention (Step 108).

When the interceptor is invoked as a result of any of these events, the interceptor readjusts the Free Count and the Unlocked Count variables in the memory manager to reflect their actual levels, by lowering them by the quantity of the Borrowed Count (Steps 112, 114). If the adjusted Free Count and the Unlocked Count are non-zero indicating that the call to MMgr-Commit-Page will be able to be satisfied without resorting to virtual memory paging (Step 116), the invention reissues the MMgr-Commit-Page call, and when it returns, readjusts the new Free Count and Unlocked Count variables by increasing them by the quantity of the Borrowed Count (Steps 132, 134, 136).

But if the Free Count or the Unlocked Count, as adjusted to their actual levels, indicate that the memory manager will be required to satisfy the commit request through virtual memory paging (Step 116), then the dynamic caching process of the invention may interpose at its discretion, based on preset conditions or dynamic monitoring, to relinquish a portion of the memory that has been borrowed for caching, up to the limit of the Borrowed Count. If this is the case, the dynamic caching process of the invention preferably selects through Least Recently Used (LRU) means an unheld page or quantity of unheld pages to be relinquished (Step 118).

The pages are then de-allocated, (e.g., through the use of __PageFree if they were allocated by __PageAllocate) with the Borrowed Count being decreased accordingly (Steps 120, 122). Finally, the MMgr__Commit__Page call is reissued to allow the request to be satisfied from free physical memory without resorting to virtual memory paging (Step 124). When the call returns, the invention readjusts the Free Count and Unlocked variables by increasing them by the new quantity of the Borrowed Count (Steps 126, 128).

It is to be appreciated that because the operations of borrowing and relinquishing pages through the use of __PageAllocate and __PageFree or otherwise may be relatively time consuming, it is preferably desirable to minimize their frequency of use. Therefore the invention also provides for pages to be borrowed or relinquished in prescribed amounts (chunks) representing a user adjustable quantity of pages, typically 16 or 32 (Step 104).

In summary, an improved method and system for allocating system memory has been described. Although the invention has been described with emphasis on particular embodiments for allocating physical memory from a memory manager device to cache memory, it should be understood that the figures are for illustration of an exemplary embodiment of the invention and should not be taken as limitations or thought to be the only means of carrying out the invention. Further, it is contemplated that many changes and modifications may be made to the invention without departing from the spirit and scope of the invention as disclosed.

What is claimed is:

1. A method of cache memory management for use with a computer operating system that utilizes a cache management software component whereby physical memory is dynamically shared between the cache system and the operating system, the method comprising the steps of:

monitoring the operating system to determine the availability of free physical memory and its location;

determining the address of a procedure in the operating system that when called, allocates a free physical memory page to linear memory;

initializing a counter with a value representing the minimum amount of physical memory allocated to the cache management software component;

allocating a portion of the free physical memory to the cache management software component;

de-allocating a portion of free physical memory from the operating system;

delineating a portion of physical memory allocated to the cache memory management software component that cannot be re-allocated to the operating system;

detecting the need for physical memory by the operating system;

monitoring the operating system to detect when said procedure has been or is about to be called by the operating system and there is less than a predetermined amount of free physical memory available;

de-allocating at least a portion of the physical memory allocated to the cache management software component and re-allocating it to the operating system as the detection and monitoring steps require;

determining the values of internal variables of the computer operating system that indicate the quantity of available free physical memory to values that reflect the memory allocation and de-allocation;

decrementing the counter if a particular page of physical memory allocated to the cache memory management software component is to remain allocated and its data retained;

if the counter has been decremented, detecting whether the counter value is negative, in which case the internal variables of the operating system are decremented;

incrementing the counter if a particular page of physical memory allocated to the cache memory management software component contains data that may be discarded and the page reloaded with new data; and if the counter has been incremented, detecting whether the counter value is negative, in which case the internal variables of the operating system are incremented.

2. A method of claim 1, further including the step of:

selecting the page of physical memory to be de-allocated from the cache system on a Least Recently Used (LRU) basis.

3. A method of claim 1, wherein the allocating step includes the step of allocating free physical memory in predetermined fixed quantities.

4. A method of claim 1, wherein the de-allocating step includes the step of de-allocating the allocated free physical memory in predetermined fixed quantities.

5. A method of cache memory management for use with the Windows® operating system that is embodied in a cache memory management software component adapted to emulate or replace the VCache software component whereby physical memory is dynamically shared between the cache memory system and the Windows® Virtual Machine Manager (VMM), the method comprising the steps of:

monitoring the VMM to determine the availability of free physical memory and its location;

initializing a counter variable with a value representing the minimum amount of physical memory allocated to the cache management software component;

determining the addresses of internal variables in the Windows® operating system representing DIPhys__Count and DIUnlock__Count fields returned by the Virtual Machine Manager (VMM) procedure __GetDemandPageInfo, wherein the values of the internal variables are representative of a quantity at least equal to the quantity of free physical memory plus the quantity of physical memory allocated to the cache memory management software component minus the minimum quantity of free physical memory to be allocated to the cache memory management system;

allocating a portion of free physical memory to the cache management software component;

decrementing the counter if a particular page of physical memory allocated to the cache memory management software component is to remain allocated and its data retained;

if the counter has been decremented, detecting whether the counter value is negative, in which case the VMM internal variables are decremented;

de-allocating the portion of free physical memory from the VMM;

detecting the need for physical memory by the VMM;

flushing at least enough cache data to re-allocate physical memory to the VMM as the detection step requires;

incrementing the counter if a particular page of physical memory allocated to the cache memory management software component contains data that may be discarded and the page reloaded with new data; and if the counter has been incremented, detecting whether the counter value is negative, in which case the VMM internal variables are incremented.

6. A method of claim 5, further including the step of delineating a portion of physical memory allocated to the cache memory management software component that cannot be re-allocated to the VMM.

7. A method of claim 5, further including the step of:

selecting the page of physical memory to be de-allocated from the cache memory management system on a Least Recently Used (LRU) basis.

8. A method of claim 5, wherein the allocating step includes the step of allocating free physical memory in predetermined fixed quantities.

9. A method of claim 5, wherein the de-allocating step includes the step of de-allocating the allocated free physical memory in predetermined fixed quantities.

10. A method for allocating free physical memory as recited in claim 7, further including the steps of:

determining the address of a procedure in the Virtual Machine Manager software component of the Windows® operating system (VMM) that when called, allocates a free physical memory page to linear memory;

monitoring said procedure to detect when the procedure has been called by the VMM and a Low Memory condition exists;

de-allocating at least a portion of the physical memory allocated to the cache memory software component and re-allocating it to the VMM; and adjusting the internal variables of the VMM to reflect the memory re-allocation.

* * * * *